Oct. 26, 1965    H. E. GRAHAM    3,214,319
HOLLOW PLASTIC STRUCTURE METHOD AND APPARATUS FOR THE SAME
Filed March 17, 1959    3 Sheets-Sheet 1
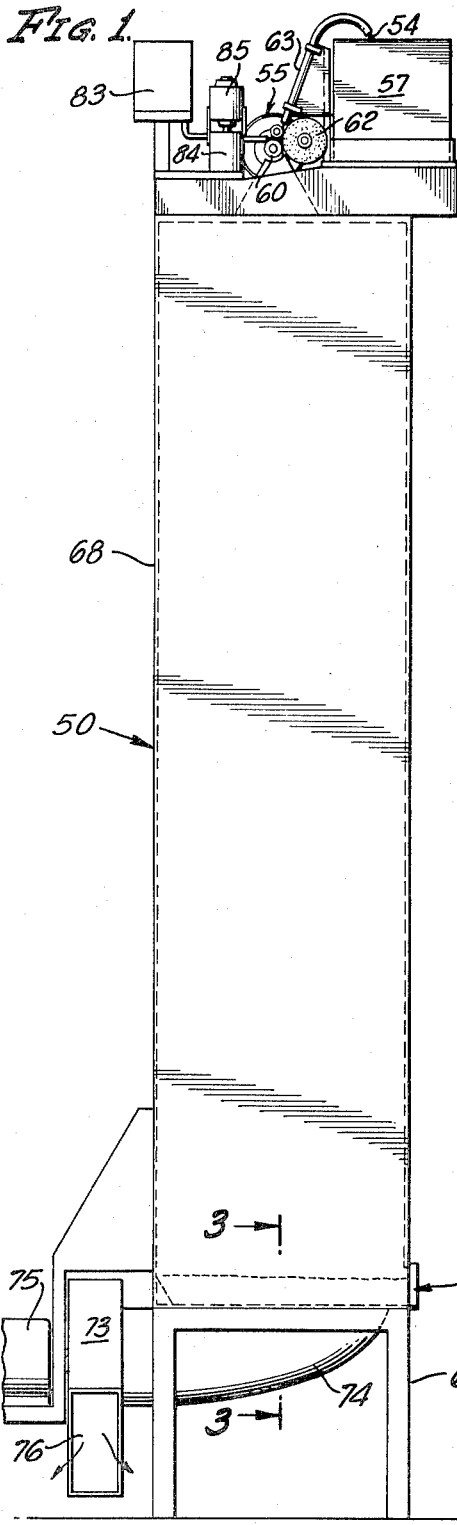
INVENTOR
HAROLD E. GRAHAM

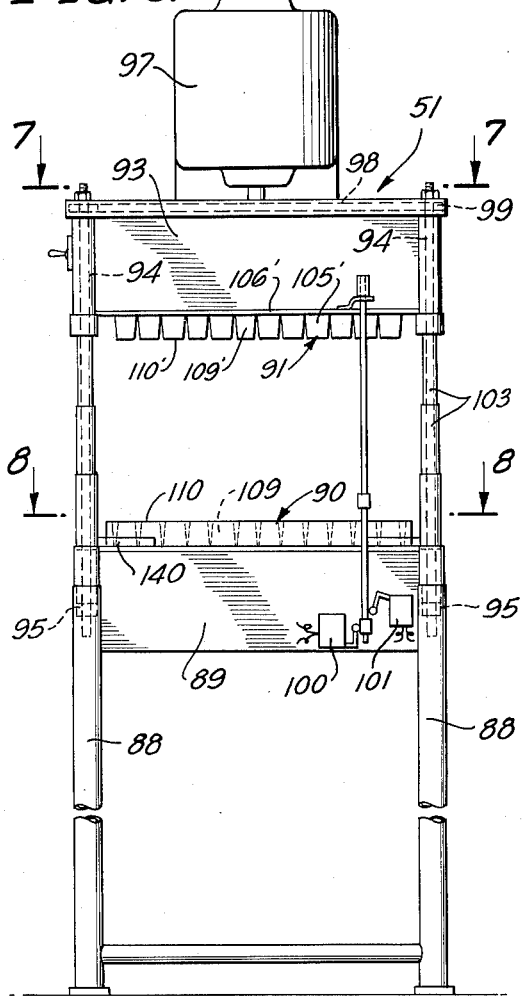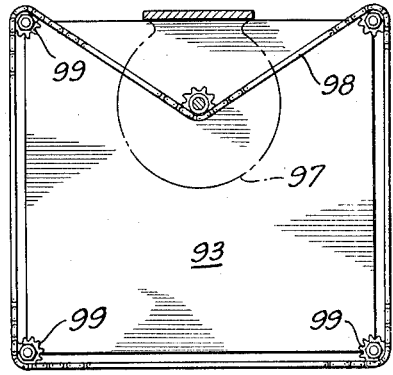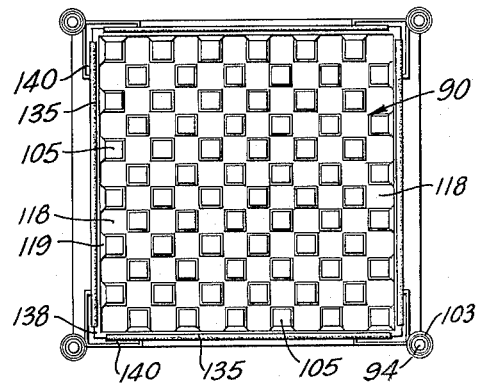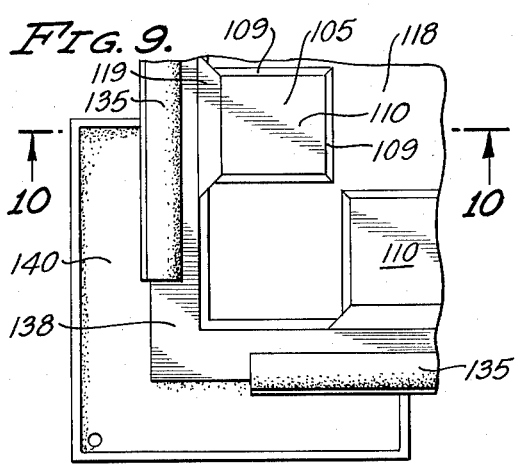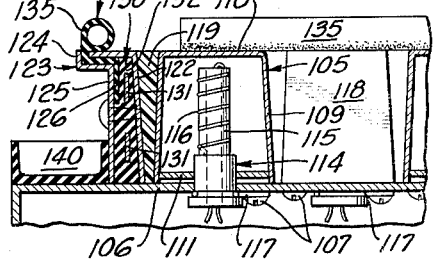
INVENTOR
HAROLD E. GRAHAM

Oct. 26, 1965  H. E. GRAHAM  3,214,319
HOLLOW PLASTIC STRUCTURE METHOD AND APPARATUS FOR THE SAME
Filed March 17, 1959  3 Sheets-Sheet 3

INVENTOR
HAROLD E. GRAHAM ns that overcomes the lack of impact strength that has
United States Patent Office 3,214,319
Patented Oct. 26, 1965

3,214,319
HOLLOW PLASTIC STRUCTURE METHOD AND APPARATUS FOR THE SAME
Harold E. Graham, Claremont, Calif., assignor of one-third to Robert N. Williams, Ontario, Calif.
Filed Mar. 17, 1959, Ser. No. 799,895
15 Claims. (Cl. 161—68)

My invention relates to hollow structures, generally of a honeycomb type, having spaced skin members adhered to opposite sides of a core member. More particularly it relates to a novel core member which when adhered to skin members gives a hollow structure of unusual ruggedthus far precluded wide acceptance of honeycomb structures in the construction of boats, buildings and marine structures requiring thick water-tight walls capable of withstanding unusual stresses.

Conventional honeycomb panels for structural work such as floor or wall members conventionally employ a resin-impregnated paper, fiber glass or metal core of honeycomb configuration cut transversely of the honeycomb passages, the cut edges being adhered to skin members. Such panels have low strength against impact. The structurally weakest portion of such panels is the bond between the edges and the skin members. Such panels are generally limited to panels having their greatest utility where little or no loads are imposed.

Sturdy honeycomb-like structures would be very useful in the construction of boats, vehicles, railroad cars, buildings or in other locations subjected to violent strains or high impact or other stresses if a way were known of producing strong panels easily shaped to desired curvature. Such panels might be surface units covering a foundation or bracing structure or a skin-stressed or self supporting structure with little or no internal framework serving a support or stiffening function. The construction of boat hulls forms a typical example and will be used to illustrate one of the many applications of the invention, exemplifying a use where it must resist severe twisting, bending and impact stresses.

It is an important object of the invention to provide an extremely sturdy hollow structure useful in withstanding severe loadings and high impact forces. A further object is to provide such a structure that can be built up in simple or compound curves and which is thus well suited to the building of hulls or other structural panels of boats, vehicles and the like.

A further object is to provide a core member of unique pattern in which hollow protrusions on one side have walls forming cavities on the other side and in which these walls are substantially perpendicular to flat top walls of such hollow protrusions. If sandwiched between skin members, such walls lie substantially perpendicular thereto and it is an object of the invention to provide such walls that are rigid in the respective planes thereof. A further object is to provide a core member in which said protrusions are four-sided figures, preferably substantially cubical, joined corner-to-corner in a checkerboard pattern, the four-sided protrusions being separated by similarly shaped cavities respectively closed by bottom walls. Still a further object is to form the core member with such side members integral with such top walls of the corresponding projection and with the bottom walls of intervening cavities.

It is an object of the invention to form a core member with adhesion surfaces equal substantially to half the total area of the core member, thus greatly strengthening the bond with an adjacent skin member and thus producing a composite structure in which the bond between these members is other than the weak surface-to-edge bond as in conventional honeycomb structures.

In the preferred practice of the invention the core member is molded to provide, when viewed from either side, a checkerboard pattern of substantially cubical projections with intervening substantially cubical spaces closed by bottom walls. The projections thus can be considered as rising corner-to-corner from the plane of such bottom walls. It is an object of the invention to space at least certain of the paired corners from each other, as by cutting narrow passages therebetween extending toward but not through the bottom walls, to impart flexibility to the core member. If all of the paired corners are thus spaced the checkerboard core member can be deformed into compound curves.

It is an object to provide such a core member and preferably to mold it initially with the paired corners of the substantially cubical projections joined. A further object is to sever the junctions while the molded member is still in a state in which it can be rather easily cut. A further object is to form or curve a skin member into desired shape and then adhere thereto the square bottom walls of such a checkerboard core member, thereby displacing the square top walls of the four-sided projections into a plane corresponding to that of the skin member. It is an object then to form a second skin member in such plane and retain it therein by adhering same to the top walls of the projections.

By the techniques to be described it becomes possible to mold such a core member of resin reinforced by glass fibers. Little or no success has attended prior attempts to mold intricate three dimensional patterns of such materials. Any attempt to mold such glass reinforced plastics requires solution of the problems of shaping a blanket of glass fibers, impregnating it with the plastic, curing the composite member in the desired shape and removing it from the mold. The problem is particularly severe when attempting to mold patterns with sharp deviations in contour. Attempts to use preformed mats made of glass fibers have proved impractical as they cannot be shaped into intricate shapes without breaking the fibers at any sharp bend or any point of large tension during the shaping. The adhesives of preformed mats and the threads used to hold them together interfere with any shaping thereof which requires that the glass fibers slip relative to each other.

It is an object of the invention to deform into a predetermined pattern a flat mass of glass fibers arranged in a random pattern. In this connection the invention preferably cuts glass roving into predetermined lengths, separates the individual fibers and deposits them on a surface in a random pattern to form a loose fluffy mass. When the mass is deformed, the individual fibers can then slip relative to each other and the fibers can be bent quite sharply, as at the junction of the walls of a hollow cube.

In the molding of a glass-fiber-reinforced core member it is an object to impregnate the glass fiber mass substantially uniformly with the liquid resin during the shaping and molding of the mass, the pressure used spreading the liquid resin to portions of the mass of glass fibers not previously coated by the liquid. A further object is to confine the lateral spreading of the resin to facilitate the impregnation of the mass.

Other objects of the invention reside in the provision of an apparatus for molding a patterned core member of the type hereinbefore mentioned and in the process steps of making it. Still further objects and advantages will be apparent to those skilled in the art from the accompanying drawings and descriptions respectively illustrating and describing an exemplary embodiment of the invention.

Referring to the drawings:

FIGS. 1–5 illustrate one type of equipment that can be used to produce the loose mass of glass fibers, FIG. 1 being a side elevational view, FIG. 2 being an enlarged view of the chopper of FIG. 1 partially in section, FIG. 3 being a cross-section of the collecting bin of FIG. 1 taken along the line 3—3 thereof, FIG. 4 being a sectional view of the collecting tray of FIGS. 1 and 3 with an auxiliary or transfer tray inverted thereon, and FIG. 5 showing the transfer tray in normal position with the mass of glass fibers thereon ready to be slid off into the molding equipment.

FIGS. 6–10 illustrate molding equipment that can be used to make square core members, FIG. 6 being a side elevational view of the equipment, FIGS. 7 and 8 being sectional views respectively taken along lines 7—7 and 8—8 of FIG. 6, FIG. 9 being an enlarged fragmentary view of a portion of FIG. 8, and FIG. 10 being a sectional view taken along the line 10—10 of FIG. 9.

Figure 19:
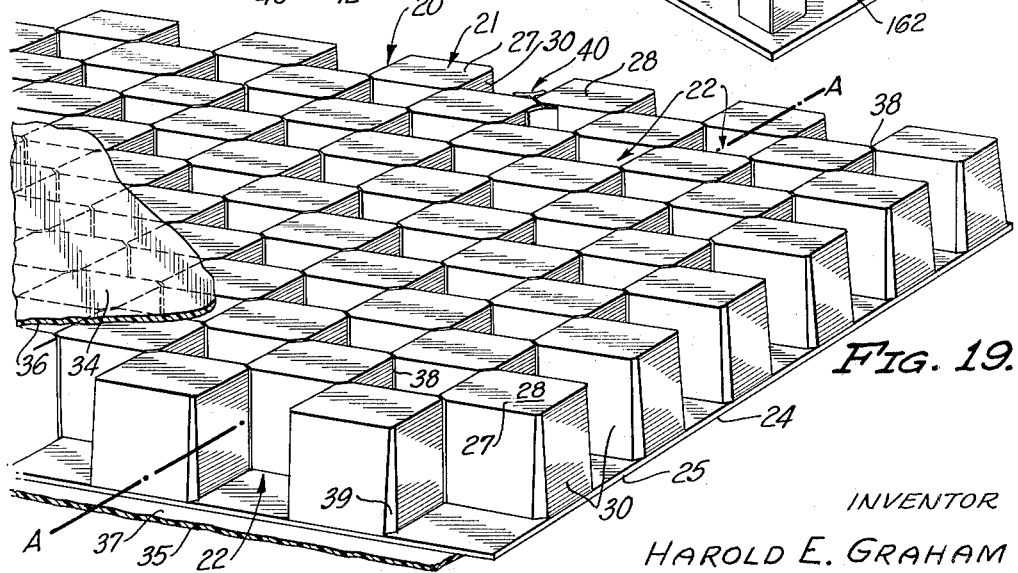
FIG. 19 is a perspective view of the hollow structure of the invention with skin members broken away to show the structure of the core member.

The invention can best be understood by initial reference to FIG. 19 which shows a core member 20 in a pattern of hollow three-dimensional figures or projections 21 arranged corner to corner with correspondingly shaped cavities 22 therebetween. As viewed from one side of the core member the cavities 22 are closed by bottom walls 24 having bonding surfaces 25, each projection 21 having a top wall 27 having a face or bonding surface 28. The bonding surfaces 28 compositely have an area substantially one half the area of the core member, the same being true of the bonding surfaces 25 on the opposite side.

Each projection 21 has three or four side walls 30 which meet at angles no greater than 90° and which are substantially perpendicular to the top and bottom walls 27 and 24 in that the faces thereof deviate from true perpendicularity with the top and bottom walls only enough to permit the core member to be withdrawn from the mold, such deviation being usually in the range of about 1–5°, usually 2–3°, which ranges are within the term substantially perpendicular as herein used. Four-sided projections 21 are preferred, in which event they are arranged in a checkerboard pattern and will have side walls 30 that are rectangular. Many advantages accrue from the use of projections 21 that are substantially cubes, with cavities 22 that are substantially cubical and are bounded by square side walls 30 of the projections. For purpose of simplicity the projections will be hereinafter referred to as cubes 21 and the cavities as cubical cavities 22.

The cubes 21 are hollow, those projecting upward on one side of the core member providing in their interiors the cavities on the other side. The four side walls 30 of each cube are of equal thickness and are molded integrally with each other and with the top wall 27 of the cube and the bottom wall of the adjacent cubical cavities 22. However while the thickness of the bottom and top walls 24 and 27 may be equal to that of the side walls 30 they can desirably be made thinner while still serving their bonding function.

The core member 20 has utility as a structural member but is usually bonded between top and bottom skin members 34 and 35 to form a hollow structure. Any suitable adhesive or bonding agent can be employed for this purpose. It will be clear that the entire surfaces 25 and 28 are available for bonding to the respective facing surfaces 36 and 37 skin members, providing a degree of bonding far in excess of that possible in the edge-to-surface bonds of conventional honeycomb structures or that possible with other patterns. In addition the strength afforded by the side walls perpendicular to the skin members and to each other far exceeds that possible with conventional honeycomb structures or with sloping-wall patterns. Bending stresses applied to the hollow structure of the invention are transferred to the side walls 30 which are rigid in their respective planes and unified in angular relationship at the cube corners, giving rise to very high strength against bending.

If the core member 20 is to be made flexible or bonded to a curved skin member at least some of the cubes 21 may be spaced corner to corner by narrow passages 38. If such passages space the paired corners of the cubes throughout the pattern the core member can be deformed into simple or compound curves. I prefer to mold all of the paired corners integral or bridged by a web and to cut the cubes apart at their corners along lines diagonal of the checkerboard pattern in manners to be described. All the cuts preferably open on only one side of the core member, e.g. the top side thereof, and extend toward but not through the bottom walls. Maximum flexure is obtainable if the core member is bent away from the side with the passages 38, i.e., in a manner to widen rather than close the passages, although limited flexibility in the opposite direction is available, up to the amount that will close the passages 38.

An imaginary line A—A at half the height of an aligned series of cubes and passing midway of the thickness of the aligned side walls 30 thereof will likewise be at the mid-thickness of the side walls of alternating cubes in the adjacent aligned series of cubes. Along such a line the side walls of adjacent cubes are in true alignment in the preferred embodiment, such side walls of adjacent cubes being also in substantial alignment at positions above and below the line A—A, deviating from exact alignment only because the planes of the cube walls of the adjacent series tip slightly in opposite sense from a plane A—A perpendicular to the skin members 34 and 35. Because of this relationship and if the passages 38 are cut after the shape of the core member 20 has been determined by molding, the passages 38 will have side walls 39 that are slightly tapered, as suggested in FIG. 19. The width of the passages 38 is preferably insufficient to intersect the hollow interiors of the cubes, leaving the cavities thereof separated from the adjacent passages 38 by an imperforate wall. Correspondingly, if the cuts forming the passages stop short of or do not penetrate the bottom walls 24 the top and bottom sides of the core member are separated imperviously.

Figures 17, 18:
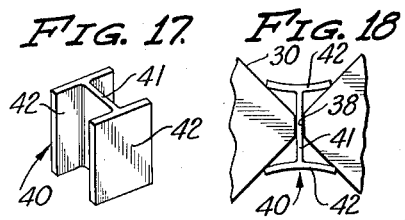
FIG. 17 is a perspective view of a sealing member useful in the invention and FIG. 18 is a fragmentary view showing such a member in the passage between two projections.

It is sometimes desired that adjacent cavities be sealed from each other when connected by such passages 38. This can be accomplished by inserting H-shaped bridge members 40 therein as suggested in FIG. 18. Such bridge members are preferably flexible and, as suggested in FIGS. 17 and 18, each may be formed with a web 41 joining the centers of two leg members 42 in a shape similar to an I-beam. These bridge members can be cut from a correspondingly shaped extrusion of rubber or flexible plastic material and the web of each can be slipped into a corresponding passage 38, the web being thinner than the passage if the core member is to be curved in a manner to narrow any of the passages. Each leg member 42 should desirably be sufficiently flexible to bridge across the two side walls 30 that angularly approach the corresponding passage, this relationship being true irrespective of the degree of flexing of the core member needed to give the desired curvature. The preferred arrangement is to make the web 41 of such length between the leg members 42 that the latter bridge the side walls while they are curved or bowed, as suggested in FIG. 18, the tips of the leg members being adhered to the side walls they contact. The ends of the bridge members are respectively adhered in fluid tight relationship with the bottom walls 24 and the skin member 34. The preferred sequence is to position the bridge members and adhere them to the core member after the latter is in the desired ultimate shape. Their top ends can then be later adhered to the skin member 34 when the top surfaces 28 are being bonded thereto.

In producing a hollow structure of an area larger than the core member 20, a number of these members can be arranged edge to edge, sometimes themselves in a checkerboard or other pattern so that adjacent edges are not all in alignment. The checkerboard pattern can continue from core member to core member if the hollow structure is plane but need not do so as breaks in the overall pattern along a lengthy hollow structure or panel will not too materially decrease the strength along the pattern disconformity in view of the closeness of the side walls 30 on opposite sides thereof. In building up a compound-curve structure such as a boat hull, the lower skin member 35 may first be formed to the desired curvature following which its surface 37 is covered with unit-sized core members arranged edge to edge and cut if necessary to give a covering pattern. The upper skin member is then bonded to or built up progressively on the top or bonding surfaces 28.

A unit sized core member of the type and pattern described can be made by equipment illustrated in FIGS. 1–10, including generally a glass unit 50 (FIGS. 1–4) and a molding unit 51 (FIGS. 6–10).

While various devices can be employed for forming the flat mass of glass fibers arranged in a random pattern, designated by the numeral 52 in FIGS. 3, 4, 5 and 11, the arrangement of FIGS. 1–3 is preferred. Multi-strand glass roving 54 is drawn continuously to a cutting station 55 from the center of a coil 56 positioned upright in a receptacle 57. Commercially available roving of 20, 40 or 60 strand can be used, the strands being commonly coated with a silane or chrome finish promoting the ultimate bond between the resin and the glass. At the cutting station 55 the roving is cut to produce fibers of a length of about 1–3", preferably a length somewhat longer than the width of the top wall 27 of each cube 21. For cube walls 27 of 1½" in width, the lengths of the fibers will typically be about 2".

Advancement and cutting of the roving 54 is by means of a motor 59 to which is connected a drum 60 having blade-like cutters 61 spaced peripherally the desired length of the fibers. This drum frictionally engages and drives a resilient wheel 62, the roving 54 being guided therebetween by a tube 63 and by passage between a guide wheel 64 and the periphery of the wheel 62 with which it engages and by which it is driven at equal peripheral speed. The cutters 61 sever the multiple strands of the roving and produce individual lengths 65 which are discharged into a horn 66 flaring into an upright space 67 within a tall and narrow housing 68 resting on legs 69. At the bottom of the upright space 67 is a tray or drawer 70 slidable transversely of the space 67 to dispose a foraminous drawer bottom 71 thereacross. The openings are sufficiently numerous to permit a free passage of air induced by a blower 73 having a suction conduit 74 extending across the housing 68 below the drawer. Driven by a motor 75, the blower 73 induces an even down draft in the space 67, distributing the lengths 65 of glass fibers uniformly in the air column therein and collecting them in a random pattern on the foraminous drawer bottom 71, the air exhausting through a discharge 76. The housing 68 may have steep baffles 77 guiding the air column and its entrained lengths 65 to the desired area of the drawer, here an area equal to or slightly greater than that of the molds to be described.

From time to time the drawer 70 is removed and covered by a shallow inverted transfer tray or member 80 having a smooth base 81 and side walls 82 on three sides. The transfer member 80 and the drawer 70 are then inverted together while in the relationship shown in FIG. 4, transferring the loose mass of randomly arranged glass fibers to the transfer member (FIG. 5) from which they can be slid into the mold as suggested in FIG. 11.

It is desirable to remove static charges from the lengths 65 to prevent their becoming attracted and attached to the internal walls of the housing 68. If trouble from this source is encountered coating these walls with aluminum foil will help. If necessary, an anti-static liquid can be sprayed from a tank 83 directly to the cutting zone by a spray device 84 which may be of the rotary type driven by a motor 85. A spray of alcohol discharging into the zone between the drum 60 and the guide wheel 64 will be found effective.

Referring to FIGS. 6 and 7, the molding unit 51 includes hollow legs 88 supporting a base 89 on which is mounted a lower die 90 adapted to mate with an upper die 91 when the dies are in closed position to form therebetween a molding space of the pattern of the desired core member 20. The upper die 91 is carried by a deck 93 rotatably carrying at its corners threaded shafts 94 received by nuts 95 in the respective hollow legs 88. A motor 97 simultaneously drives the threaded shafts through any suitable connection, shown as a chain 98 linking a motor sprocket with sprockets 99 fixed to the respective threaded shafts. Limit switches 100 and 101 are disposed in a suitable control circuit for the motor 97 to drive it in forward and rearward directions to respectively close and open the dies 90 and 91. Telescoping tubes 103 suround each threaded shaft 94 to protect it from accidental contact or spill-over of plastic.

The checkerboard pattern of the dies is shown in FIG. 8 while details of the lower die 90 are shown in FIGS. 9 and 10. Referring thereto the die 90 provides hollow members 105 each substantially cubical in external form except for the draft, exaggerated in FIG. 10 for clarity, needed to pull the molded core member from the die. While such hollow members 105 can be integral with a base member 106, I have initially made them separate, being secured to the member 106 in a checkerboard pattern by screws 107. Each member 105 is shown as an inverted four sided cup with equal-thickness side walls 109 closed by a crest wall 110. An aperture of a mounting wall 111 secured inside the member 105 receives the screws 107 and helps to mount an electric heating element 114 having a ceramic core 115 wound with a resistance winding 116. Each heating element 114 is centered in its respective member 105 and positioned longitudinally by a clip 117 fitting in a peripheral groove of the ceramic core 115. The upper die 91 is formed similarly but its hollow members 105' are laterally displaced to extend into the substantially cubical cavities 118 of the lower die closed by square surfaces of the base member 106. There results between the side walls 109 and 109' and between the crest walls 110 and 110' and the square surfaces of the respective base members 106 and 106' a molding space of the checkerboard pattern described.

Each alternate square of the pattern along the periphery of the core member is kept open on one side by a wall 119 of the lower die. All of the molding surfaces of the dies are preferably coated with polytetrafluorochloroethylene ("Teflon") or other material facilitating separation of the molded core member therefrom. Such coating of the die surfaces avoids the need for release agents of the grease or film type which transfer to the core member and must be completely removed before adhering the skin members thereto.

The lower die is peripherally heated to aid in uniformly and rapidly curing the resin of the core member. The upper die need not be thus heated at its periphery because when closed it intermeshes with the lower die and thereby receives peripheral heat from the peripheral heater of the latter. Nevertheless the peripheral heating can be a feature of the upper rather than the lower die if such arrangement is preferred. As shown in FIG. 10, the lower die 90 has a frame including an inverted L-shaped member 122 along each side with an offset member 123 spaced outwardly therefrom. The latter member has a flange 124 offset outwardly from a mounting web 125. Between the web 125 and the adjacent L-shaped member 122 is a flange 126 of a deformable dam member 128 and a heater strip 130. The latter includes resistance strips 131 embedded in a suitable material 132 such as silicone rubber that will withstand the heating of the resistance strips 131 when they and the resistance windings 116 of both dies are connected to a suitable circuit energized from a source of electrical energy through suitable thermostatic switches not shown.

Figure 14:
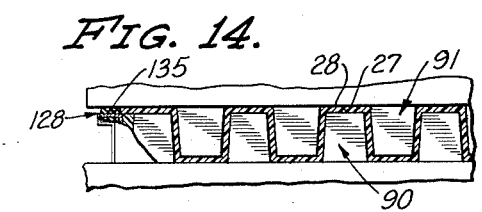

Offset from the flange 126 of each deformable dam member 128 but preferably formed integral therewith is a dam 135 formed as a tube deformable by pressure from the upper die 91 when closing. FIG. 14 shows these dams 135 laterally collapsed by such pressure when the dies are in completely closed position. The dam members 128 are formed of any suitable elastomeric material such as silicone rubber. The dams 135 thereof are of insufficient length to meet at the corners of the die, leaving corner passages 138 through which any excess resin can exude when the dies close and the dams 135 are deformed by the upper die 91 to form a seal therewith. Below each corner passage 138 is a receptacle 140 for receiving such exuded excess, each receptacle being preferably made of glass impregnated silicone rubber.

Any suitable plastic can be employed in molding the core member, resins being presently the best known plastic for the purpose in view of their long chain molecules with cross links. Polyester resins are preferred because of their lower cost and good strength factors if cured at low temperatures. Epoxy resins can be used if the cure is to be completely under high temperature conditions. Silicone resins can also be used. In practice a suitable resin compounded to cure to a green state at a predetermined temperature in a predetermined time is procured, e.g., a polyester resin compounded to cure at about 240° F. in about 4 minutes. Such a resin usually contains a small amount of styrene to thin the resin; also a suitable promoter for the cure characteristics. A suitable catalyst is added before using the resin, typically one that requires heat to start the curing cycle. An example would be an acid catalyst used with a small amount of benzol peroxide. The invention employs plastics and techniques well known by plastic engineers, it being understood that the above specific materials are recited merely as exemplary and not by way of limitation.

In a typical operation, employed with dies designed to produce a core member about 18 x 18 inches in size with cubes approximately 1½ inches in width and height, the dies are preheated while open to about 240° F. A mass 52 of randomly arranged glass fibers, about 1–3 inches thick and made of fibers of an individual length of about 2 inches, is slid from the transfer member 80 directly onto the lower die 90, being of a size to cover same.

Figure 11:
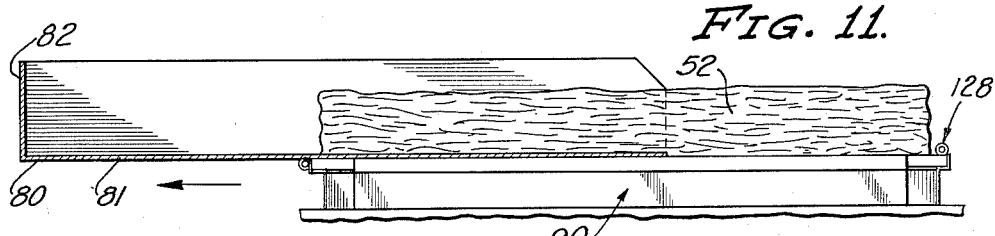
FIGS. 11–15 are sequence views illustrating respectively the steps of transferring the mass of glass fibers to the mold, preforming the mass, deposition of the resin, initially curing the resin during the time the dies are closed and the later step of removing the cured core member from the mold.
Figure 12:
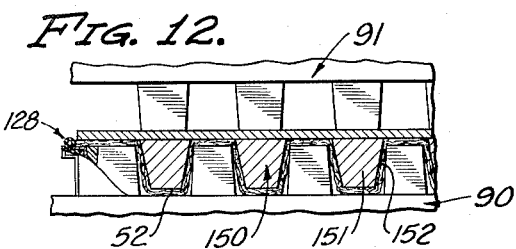

While not always necessary, I prefer to preform the mass 52 to a semi-cubical shape or pattern at this time, as by placing a supplemental die 150 on the mass 52 and temporarily lowering the top die to the position shown in FIG. 12. This supplemental die 150 has square projections 151 in a checkerboard design but with distinctly pyramidical side surfaces 152, usually with a draft of at least 10°, to deform the mass 52 toward but not into its ultimate pattern. Such initial and ultimate deformation causes the fibers to slip relative to each other and not fracture because of tension or bending at the corners of the dies 90, 91 or 150, particularly if the starting mass is loose, not compacted, not held together by adhesives or prior compaction or sewn together by threads and if the fibers have surfaces that can readily slide relative to each other. The supplemental die 150 is then lifted from its temporary position between the dies 90 and 91.

Figure 13:
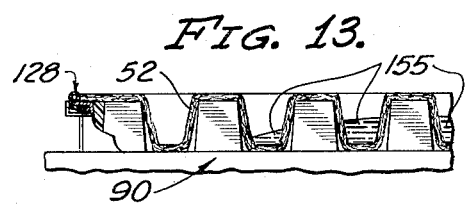

I have found that it is not essential to spray or evenly distribute the resin over the preformed mass or to completely impregnate the fibers thereof at this time as a separate step. Instead, an amount of the liquid resin slightly in excess of that needed for impregnation of the fiber mass and formation of the core member is poured in a central zone of the preformed mass on the lower mold, forming a central pool 155 as suggested in FIG. 13. The dies 90 and 91 are then closed and it is found that the resin of the pool spreads radially through the fibers in a manner to impregnate the mass uniformly. When the periphery of the spreading resin mass reaches the sides of the lower die it encounters the dam members 128. By now the upper die has started to deform the tubular dams 135, forming a seal therewith which confines the resin mass to move through the fiber mass along the sides of the die to fill the corners of the molding space, any small excess exuding from the passages 138 and collecting in the receptacles 140 for reuse.

The heating elements 114 and 131 are preferably energized immediately after the dies close, primarily to prevent the edges from radiating more heat than is removed from the center of the molding space and thereby preventing a hot spot in the center. The preheated dies usually drop in temperature about 20° F. because of the cold resin but the brief energization of the heating elements coupled with the heat from the exothermic polymerizing reaction causes the temperature of the dies to increase to about 265° F.

The temperature can be kept elevated if a complete cure is to be effected. However in many instances, e.g. if the passages 38 are to be formed by cutting, it is distinctly preferable to open the dies when the resin starts to gel or is in what is sometimes termed a "green" state. As the dies open, the impregnated mass always holds to the lower die, probably because of the greater surface of contact afforded by the dam members of this die and because of the weight of the molded member.

Figure 16:
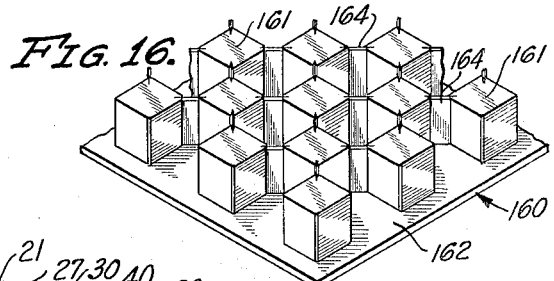
FIG. 16 illustrates a tool used for severing the corners of the projections of the core member.

At this time it is very easy to form the passages 38 and thus sever the edge-to-edge junction of adjacent cubes. One way of doing this rapidly is by a cutting die 160 shown in FIG. 16. This die consists of a pattern of blocks 161 on a base 162, the blocks being separated corner to corner and being of a size to extend loosely into the cavities 22 of the core member. The spaced corners of the blocks 161 are bridged by blades 164 with their edges molded in or fitting in cuts in the adjacent corners. The blades 164 are made of thin metal and are ground to sharp edges on their sides facing away from the base 162. This cutting die 160 is then pressed temporarily downward in proper orientation with the checkerboard pattern of the lower die 90, easily severing the junctions of the cube corners of the core member. The height of the blades 164 is sufficient only to cut substantially to the bottom walls 24 and not penetrate same. This cutting severs the partly polymerized resin and the fibers joining the cube corners. The cutting die 160 is then removed.

Figure 15:
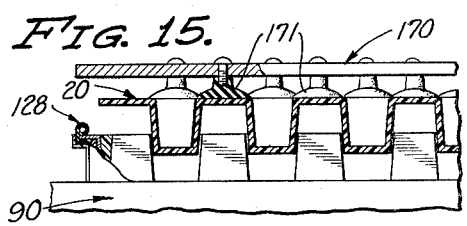

The resulting core member can be further polymerized while in the lower die. This needs to take place only until the core member can be lifted from this die after which the curing of the core member can be completed on any flat or slightly curved surface. If necessary a lifting member 170 (FIG. 15) equipped with vacuum cups 171 can be used to lift the core member from the lower die. Use of such a member is usually unnecessary.

The edges of the core member are then trimmed and the member is in condition for later assembly, alone or with other core members arranged edge to edge, between the skin members 34 and 35 in manners heretofore described. The skin members may be metal, wood or composition sheets or sheets of plastic. A most desirable construction results from forming the skin member 35 of glass reinforced resin in the desired plane or curved shape and then bonding the surfaces 25 thereto by use of any suitable adhesive, such as a polyester resin. The other skin member 34 is then formed or laid on the surfaces 28, being bonded thereto.

Various changes can be made in the steps and structures herein exemplified without departing from the spirit of the invention.

I claim as my invention:

1. As an article of manufacture, a one-piece core member comprising a checkerboard pattern of hollow four-sided geometric figures arranged corner to corner with a checkerboard pattern of four-sided cavities therebetween, each cavity having a bottom wall, each hollow figure comprising four substantially rectangular side walls each integral with a bottom wall of an adjacent cavity, each hollow figure having a top wall integral with its four side walls, said bottom walls and said top walls lying in parallel planes, said side walls lying in planes substantially at right angles to said parallel planes, each side wall being rigid in its respective plane, said hollow figures being spaced corner to corner by narrow passages, and flexible H-shaped bridge members in at least some of said passages, each bridge member comprising a web in the respective passage between two of the geometric figures and extending between two cavities joined by such passage, each bridge member having two leg members respectively in said two cavities joined at their centers by said web and respectively contacting faces of said two geometric figures disposed at right angles to each other.

2. As an article of manufacture a thick high-strength one-piece four-sided die-molded structural core member suitable as a structural core of a laminated structural panel for boat hulls, buildings, vehicles and the like, said core member consisting of molded glass-fiber-reinforced resin walls forming on each side of the core member a checkerboard pattern of hollow substantially cubical protrusions arranged corner-to-corner in rows with a corresponding checkerboard pattern of substantially cubical cavities between the protrusions, the hollow protrusions on one side of said core member respectively forming the cavities on the other side, the protrusions on both sides of said core member providing square rigid top walls having resin-surface molded flat top faces, said top faces lying in two parallel planes spaced the thickness of said core member, the combined areas of the top faces on each side of said core member being substantially equal to one-half the total area of said core member measured between its four boundaries, each protrusion having four molded resin-surface substantially square impervious side walls rigid in their respective planes extending between said two parallel planes at substantially right angles thereto, the four side walls of each protrusion being molded integrally with each other at the side-wall-formed corners of such protrusion and molded integrally and at substantially right angles with the top wall of such protrusion, the side-wall-formed corners of diagonally adjacent protrusions throughout said checkerboard pattern being molded integrally throughout the heights of such corners measured between said parallel planes but at least some of such side-wall corners of diagonally adjacent protrusions being spaced from each other by narrow cuts each of substantially uniform width and extending throughout the height of such corners without intersecting either of the cavities on the opposite side of said core member formed by these diagonally adjacent protrusions, each top wall and its four substantially square side walls being made of resin reinforced by glass fibers substantially throughout the thickness of such walls, the rigid side walls of the protrusions at one side of any given row of such protrusions alternating with the rigid side walls of the protrusions of an adjoining row, such alternating side walls lying substantially in a common plane perpendicular to the two parallel planes.

3. A structural unit comprising in combination: a curved skin member having a curved surface; a flexible core member having on each of its opposite sides a checkerboard pattern of individually rigid hollow right parallelepiped protrusions of equal height with a checkerboard pattern of correspondingly shaped cavities therebetween, the hollow right parallelepiped protrusions on one side respectively forming the cavities on the other side, each protrusion on each side of said core member providing a top wall having a square top face joined rigidly and at substantially a right angle with four rectangular side walls rigid in their respective planes, the square top faces on opposite sides of said core member being in parallel planes, at least some of the protrusions on one side only of said core member being separated corner-to-corner by narrow passages extending throughout the height of such corner-to-corner protrusions from the top walls on one side of said core member to the top walls on the other side thereof without intersecting the cavities on the opposite side of said core member, each passage being of substantially uniform width throughout the height of the protrusions bounding it when the top walls on both sides of said core member lie in flat planes, said passages being aligned diagonally of the checkerboard pattern, the square top faces on one side of said core member being of a combined area equal substantially to one-half the area of said curved surface and being adhered surface-to-surface to such area of said curved surface to deform said core member to the curve of said curved surface with the passages between corresponding paired corners tapering in a direction away from the plane of their adjacent non-penetrated top walls on said other side of said core member when said core member is thus deformed, the square top faces on said opposite side of said core member when thus deformed lying in a plane corresponding in curvature to said curved surface; and a second curved skin member having a surface thereof adhered surface-to-surface to the square top faces of said opposite side thereby to be held in said plane of corresponding curvature.

4. A method of making a glass fiber reinforced plastic member each side of which has rows of uniform-height substantially cubical hollow protrusions joined corner to corner with intervening substantially cubical cavities, the hollow interiors of said protrusions on one side forming the cavities on the other side, which method involves the use of flat superimposed mating dies having therebetween when closed a molding space corresponding to the desired pattern of protrusions and cavities of the plastic member, which method includes the steps of: depositing individual glass fibers in random relation on a flat surface to form a thick loose mass of glass fibers arranged in random pattern free of attachment to each other, the thickness of said mass being dimensionally at least substantially equal to the height of said substantially cubical projections, moving said mass from a flat surface onto the lower of said dies and closing said dies to compress and deform said mass of glass fibers into said pattern; surrounding the glass fibers of said mass with resin during such deformation into said pattern by placing the resin locally in liquid state on said mass and employing the closing of said dies to spread the resin and effect uniform impregnation of the compressed mass of glass fibers; and at least partially polymerizing said resin while said dies are closed.

5. A method of making a glass fiber reinforced plastic member, which method includes the steps of: depositing randomly on a surface a thick flat loose mass of glass fibers arranged in random pattern in said mass; coating said glass fibers of said mass with resin; pressurally compressing and deforming the resulting mass into a thinner-walled core member consisting of a pattern of square hollow geometric figures joined integrally corner to corner with correspondingly shaped cavities therebetween, each geometric figure having side walls substantially perpendicular to a top wall thereof and each cavity being closed by a bottom wall, said glass fibers slipping and being displaced relative to each other during such pressural compression and deformation to occupy all walls of said checkerboard-pattern core member; at least partially polymerizing said resin while thus deformed to form a plastic member; and severing at least some of the corner-to-corner junctions of said geometric figures by cutting along such junctions exclusively from one side of the plastic member and only to a depth short of said bottom walls thus leaving said bottom walls intact.

6. A method of making a high-strength glass-fiber-reinforced structural resin member each side of which has a checkerboard pattern of hollow substantially cubical protrusions with intervening substantially cubical cavities, the hollow interiors of the protrusions on one side forming the cavities on the other side and such hollow protrusions on said one side being joined corner to corner to form the cavities on such one side, which method involves the use of flat superimposed mating dies having therebetween when closed a molding space corresponding to the desired pattern of protrusions and cavities of the reinforced structural resin member, the lower of said dies having a number of substantially cubical die cavities corresponding in size and pattern to said substantially cubical protrusions, which method includes the steps of: depositing randomly on a flat surface a thick flat loose mass of individual glass fibers arranged in random pattern in said loose mass and free of attachment to each other while confining the glass fibers to deposit in an area of said surface substantially corresponding in shape and size to the area of said lower die; placing said mass while in its deposited random pattern on said lower die; compressing and deforming said mass simultaneously into all of said die cavities of said lower die and continuing such compressing and deforming by closing said dies until the mass of glass fibers is deformed into said checkerboard pattern of substantially cubical protrusions and cavities as determined by the die surfaces of said molding space; impregnating said mass of glass fibers with resin during such deformation into said pattern by placing the resin locally in liquid state on said mass and spreading same therethrough by pressure exerted during the closing of said dies to effect uniform impregnation of the highly compressed mass of glass fibers and filling of all portions of said molding space between the compressed glass fibers therein said space; and at least partially polymerizing said resin while said dies are closed.

7. A method of making a structural resin member as defined in claim 6 in which said loose mass of glass fibers is formed by cutting said glass fibers to length, immediately moving the cut fibers as fast as they are cut toward said flat surface to deposit loosely on each other in random pattern to build up said flat loose mass thereof, said flat loose mass thus formed being placed on the lower of said dies by sliding such mass from a flat supporting surface for such mass onto the lower of said dies.

8. A method of making a glass-fiber-reinforced structural resin member each side of which has a checkerboard pattern of hollow right parallelepiped protrusions separated by right parallelepiped cavities, the hollow interiors of the protrusions on one side forming the cavities on the other side and such hollow protrusions on said one side being joined corner to corner to form the cavities on such one side, which method involves the use of two flat superimposed mating dies having therebetween when closed a molding space corresponding to the desired pattern of right parallelepiped protrusions and right parallelepiped cavities of the resin member, the lower die having a checkerboard pattern of die cavities which method includes the steps of: placing between said dies a thick loose unmatted and uncompacted mass of individual glass fibers arranged in random pattern and free of attachment to each other in such mass; initially deforming said loose mass of glass fibers partially toward said desired checkerboard pattern of right parallelepiped protrusions and right parallelepiped cavities by simultaneously pressing into said die cavities overlying portions of said loose mass of glass fibers to deform such mass into the lower die into a checkerboard pattern of frusto pyramidical cavities corresponding in position to the desired cavities of said checkerboard pattern; then placing a pooling of said resin in liquid state centrally on said initially deformed mass of glass fibers while in the lower die with the liquid resin disposed exclusively in the frusto pyramidical cavities near the center of said lower die; closing said dies to further compress and further deform said initially deformed mass into said checkerboard pattern of right parallelepiped protrusions and right parallelepiped cavities, such further compression being sufficient to spread said resin throughout said molding space during such further compression of said initially deformed mass; and at least partially polymerizing said resin while said dies are closed.

9. A method of making a glass-fiber-reinforced plastic structural core member, which method includes the steps of: depositing randomly on a surface a thick flat loose mass of individual glass fibers arranged in random pattern in said mass; impregnating said mass of glass fibers with resin and pressurally compressing, deforming and molding the mass into a structural core member comprising a uniform pattern of uniform-height hollow geometric figures joined integrally corner-to-corner throughout the height thereof with correspondingly shaped cavities therebetween, each geometric figure having side walls integral with and substantially perpendicular to a top wall thereof and each cavity being closed by a bottom wall integral with said side walls, said glass fibers slipping and being displaced relative to each other during such pressural compression and deformation and occupying said top, bottom and side walls as reinforcements within the resin of these walls; at least partially polymerizing said resin of the resulting structural core member; and severing at least some of the corner-to-corner junctions of said geometric figures by cutting along such junctions exclusively from one side of the structural core member throughout the height of said geometric figures and to a depth adjacent but not through said bottom walls.

10. A method for making a fiber-glass-reinforced structural resin member each side of which has a checkerboard pattern of hollow substantially cubical protrusions with intervening substantially cubical cavities, the hollow interiors of the protrusions on one side forming the cavities on the other side and such hollow protrusions on each side being joined corner-to-corner to form the cavities on such side, which method involves the use of two rectangular flat superimposed molding dies having substantially cubical die projections separated corner to corner with substantially cubical die cavities therebetween disposed in said checkerboard pattern, said flat superimposed dies having therebetween when closed a mold space corresponding to such checkerboard pattern of substantially cubical protrusions and cavities of said structural member, which method involves also the use of a supplemental die having generally frusto pyramidical projections of the same pattern and spacing as the upper of said molding dies, which method includes the steps of: cutting lengths of glass fibers from a multi-strand glass roving; moving the cut fibers toward a rectangular area of a flat surface to deposit loosely and sequentially on each other in random pattern to form a loose thick unmatted rectangular mass of individual glass fibers free of attachment to each other in said mass, said mass being of a size to cover said lower die; sliding said loose thick rectangular mass while in substantially the unmatted form in which it was produced from a flat surface onto the lower of said molding dies in covering relation therewith; lowering said heating means on the other side of such wall for heating same.

References Cited by the Examiner
UNITED STATES PATENTS

| | | | |
|---|---|---|---|
| 1,000,694 | 8/11 | Schaefer et al. | 154—155 |
| 2,331,146 | 10/43 | Slayter. | |
| 2,378,642 | 6/45 | Kopplin. | |
| 2,541,297 | 2/51 | Sampson et al. | 154—110 |
| 2,689,988 | 9/54 | French | 154—45.9 |
| 2,728,479 | 12/55 | Wheeler | 154—45.9 |
| 2,745,463 | 5/56 | Rempel | 154—1 |
| 2,746,049 | 5/56 | Hudson | 154—110 |
| 2,792,164 | 5/57 | Cauffiel | 244—125 XR |
| 2,809,908 | 10/57 | French | 154—45.9 |
| 2,856,323 | 10/58 | Gordon | 154—55 XR |
| 2,858,247 | 10/58 | De Swart | 154—45.9 |
| 2,860,082 | 11/58 | Murdock et al. | 156—110 |
| 2,960,146 | 11/60 | Williams | 154—32 |

ALEXANDER WYMAN, *Primary Examiner.*

CARL F. KRAFFT, EARL M. BERGERT, *Examiners.*

UNITED STATES PATENT OFFICE
CERTIFICATE OF CORRECTION

Patent No. 3,214,319                          October 26, 1965

Harold E. Graham

It is hereby certified that error appears in the above numbered patent requiring correction and that the said Letters Patent should read as corrected below.

Column 4, line 41, after "plane" insert -- through --; column 9, line 52, for "four-" read -- four --; column 11, line 50, strike out "said space" column 12, lines 10 and 11, for "pooling" read -- pool --; column 13, line 10, strike out "exclusively"; line 12, after "mass" insert -- exclusively --.

Signed and sealed this 2nd day of August 1966.

(SEAL)
Attest:

ERNEST W. SWIDER                                  EDWARD J. BRENNER
Attesting Officer                                      Commissioner of Patents